US006856966B1

(12) United States Patent
Fujimoto

(10) Patent No.: US 6,856,966 B1
(45) Date of Patent: Feb. 15, 2005

(54) PRODUCT DELIVERY METHODS

(75) Inventor: Jun Fujimoto, Tokyo (JP)

(73) Assignee: Seta Corporation, Tokyo (JP)

( * ) Notice: Subject to any disclaimer, the term of this patent is extended or adjusted under 35 U.S.C. 154(b) by 0 days.

(21) Appl. No.: 09/452,135

(22) Filed: Dec. 1, 1999

Related U.S. Application Data

(63) Continuation-in-part of application No. 08/965,996, filed on Nov. 7, 1997, now Pat. No. 6,018,720.

(30) Foreign Application Priority Data

Aug. 9, 1997   (JP) ............................. 9-214318

(51) Int. Cl.$^7$ ............................................ G06F 17/60
(52) U.S. Cl. ...................................................... 705/21
(58) Field of Search ............................ 235/380; 717/11; 705/17, 21, 30, 41

(56) References Cited

U.S. PATENT DOCUMENTS

| | | | |
|---|---|---|---|
| 4,992,940 A | | 2/1991 | Dworkin |
| 5,444,861 A | | 8/1995 | Adamec et al. |
| 5,544,246 A | * | 8/1996 | Mandelbaum et al. ........ 380/23 |
| 5,559,313 A | * | 9/1996 | Claus et al. .................. 705/30 |
| 5,649,187 A | | 7/1997 | Hornbuckle |
| 5,710,884 A | | 1/1998 | Dedrick |
| 5,715,403 A | | 2/1998 | Stefik |
| 5,727,215 A | | 3/1998 | Rynaski et al. |
| 5,748,967 A | | 5/1998 | Nakamura et al. |
| 5,752,040 A | | 5/1998 | Kaneko et al. |
| 5,761,308 A | | 6/1998 | Torii et al. |

(List continued on next page.)

FOREIGN PATENT DOCUMENTS

GB   2 196 766 A  *  5/1988  ............ H04B/7/00

OTHER PUBLICATIONS

Website printout (2 pages) of www.smartcard.org dated Nov. 11, 1998. Retrieved from the Internet form www.web.archive.org on Sep. 20, 2004.*
White, Ron, How Computers Work, Millennium Ed. Que Corporation, Sep. 1999.*
Derfler, Frank J. et al. How Networks Works, Millennium Ed., Que Corporation, Jan. 2000.*
Gralla, Preston, How the Internet Works, Millennium Ed., Que Corporation, Aug. 1999.*

*Primary Examiner*—Andrew J. Fischer
(74) *Attorney, Agent, or Firm*—Oliff & Berridge, PLC

(57) ABSTRACT

A method and system for delivering data, goods, or services, by which additional data such as purchase history data, purchaser inherent data and accounting data, which correspond to a purchaser, are recorded in a rewritable medium, to which primary data is, rewritten or reloaded, and by which a high-security system can be easily configured by collating such additional data with corresponding additional data recorded in a computer of a data deliverer or management company. A purchaser purchases a purchaser record medium, to which primary data is rewritten or reloaded, at a shop. Further, the purchaser deposits, namely, writes cash data representing a predetermined amount of money thereto. At that time, the purchaser also writes purchaser inherent data thereto. When primary data, goods, or services are requested, data recorded in the purchaser record medium is sent to the data deliverers or management companies through communication networks and collated with past data recorded in computers of the data deliverers or management companies. If matched, the primary data, goods or service is delivered from the data deliverer or the management company. Additional data is then recorded in the purchase record medium. Simultaneously, additional data relating to the primary data, goods or service is recorded in the computers of the data deliverers or management companies.

27 Claims, 9 Drawing Sheets

U.S. PATENT DOCUMENTS

| | | | |
|---|---|---|---|
| 5,761,499 A | | 6/1998 | Sonderegger |
| 5,809,145 A | | 9/1998 | Slik et al. |
| 5,864,825 A | * | 1/1999 | Kobayashi et al. ............ 705/24 |
| 5,869,823 A | * | 2/1999 | Bublitz et al. ............... 235/380 |
| 5,940,805 A | * | 8/1999 | Kopp ............................ 705/26 |
| 6,012,049 A | * | 1/2000 | Kawan ......................... 705/41 |
| 6,038,552 A | * | 3/2000 | Fleischl et al. ................ 705/44 |
| 6,105,009 A | * | 8/2000 | Cuervo ......................... 705/43 |
| 6,112,987 A | * | 9/2000 | Lambert et al. ............. 235/380 |
| 6,129,274 A | * | 10/2000 | Suzuki ........................ 235/381 |
| 6,131,090 A | * | 10/2000 | Baddo, Jr. et al. ............ 706/23 |
| 6,321,980 B1 | * | 11/2001 | Yaxumi et al. .............. 235/379 |

* cited by examiner

PI/A.PURCHASER INHERENT-DATA/ACCOUNTING-DATA

FIG. 5

Z2 DATA FORMAT FOR PURCHASE HISTORY

| | |
|---|---|
| A1. | TITLE OF PURCHASED SOFTWARE |
| A2. | PRICE OF PURCHASED SOFTWARE |
| A3. | SHOP HAVING SOLD SOFTWARE |
| A4. | DATE AND TIME OF PURCHASE |
| A5. | NO. OF WRITE MACHINE |
| B1. | TITLE OF PURCHASED SOFTWARE |
| B2. | PRICE OF PURCHASED SOFTWARE |
| B3. | SHOP HAVING SOLD SOFTWARE |
| B4. | DATE AND TIME OF PURCHASE |
| B5. | NO. OF WRITE MACHINE |
| C1. | TITLE OF PURCHASED SOFTWARE |
| C2. | PRICE OF PURCHASED SOFTWARE |
| C3. | SHOP HAVING SOLD SOFTWARE |
| C4. | DATE AND TIME OF PURCHASE |
| C5. | NO. OF WRITE MACHINE |
| ⋮ | |

EXAMPLE OF PURCHASE HISTORY DATA

| | |
|---|---|
| a1. | STRONGEST SHOGI 1997 |
| a2. | 5800 |
| a3. | THE CONVENIENCE KAMATA BRANCH STORE |
| a4. | 199704101625 |
| a5. | 00002537 |
| b1. | BEST GOLF NAGANO PREFECTURE |
| b2. | 4900 |
| b3. | MARUDAI DEPARTMENT STORE SHINJUKU BRANCH STORE |
| b4. | 199705051138 |
| b5. | 00000271 |
| c1. | MAH-JONG LI-ZHI IPPATSU |
| c2. | 5500 |
| c3. | YOTSUKOSHI DEPARTMENT STORE SHIBUYA BRANCH STORE |
| c4. | 199706202157 |
| c5. | 00005963 |
| ⋮ | |

FIG. 6

| Z3 | PURCHASER'S INHERENT-DATA ACCOUNTING-DATA FORMAT | EXAMPLE OF PURCHASER'S INHERENT-DATA/ACCOUNTING-DATA |
|---|---|---|
| PURCHASER'S INHERENT DATA | D1. ID NUMBER<br>D2. PASSWORD<br>D3. DATE OF PURCHASER'S BIRTH<br>D4. DISTINCTION OF SEX | d1. ST781249<br>d2. 7298<br>d3. 1959.2.23<br>d4. 0 |
| ACCOUNTING DATA | E1. DATE OF ACCOUNTING<br>E2. AMOUNT OF DEPOSITED MONEY<br>E3. AMOUNT OF PAID MONEY<br>E4. BALANCE<br>E5. SHOP HAVING ACCOUNTED | e1. 199704101620<br>e2. 20000<br>e3. 0<br>e4. 20000<br>e5. THE CONVENIENCE KAMATA BRANCH STORE |
| | F1. DATE OF ACCOUNTING<br>F2. AMOUNT OF DEPOSITED MONEY<br>F3. AMOUNT OF PAID MONEY<br>F4. BALANCE<br>F5. SHOP HAVING ACCOUNTED | f1. 199704101625<br>f2. 0<br>f3. 5800<br>f4. 14200<br>f5. THE CONVENIENCE KAMATA BRANCH STORE |
| | G1. DATE OF ACCOUNTING<br>G2. AMOUNT OF DEPOSITED MONEY<br>G3. AMOUNT OF PAID MONEY<br>G4. BALANCE<br>G5. SHOP HAVING ACCOUNTED | g1. 199705051138<br>g2. 0<br>g3. 4900<br>g4. 9300<br>g5. MARUDAI DEPARTMENT STORE SHINJUKU BRANCH STORE |
| | H1. DATE OF ACCOUNTING<br>H2. AMOUNT OF DEPOSITED MONEY<br>H3. AMOUNT OF PAID MONEY<br>H4. BALANCE<br>H5. SHOP HAVING ACCOUNTED | h1. 199706202157<br>h2. 0<br>h3. 5500<br>h4. 3800<br>h5. YOTSUKOSHI DEPARTMENT STORE SHIBUYA BRANCH STORE |

Accounting Information

Purchase Information

PRODUCT DELIVERY METHODS

This is a Continuation-in-Part of application Ser. No. 08/965,996 filed Nov. 7, 1997 now U.S. Pat. No. 6,018,720.

BACKGROUND OF THE INVENTION

1. Field of Invention

The invention generally relates to product delivery methods and systems therefor and, more particularly, to methods for performing product delivery and accounting simultaneously by utilizing rewritable record medium, and systems therefor.

2. Description of Related Art

Typical cards used instead of cash are a prepaid card, credit card and an IC (integrated circuit) card.

A prepaid card is a kind of a book of coupons or tickets, on which necessary information is written by using magnetism instead of using ink, and can be utilized for paying money, the cumulative amount of which is not more than a limit amount recorded on a magnetic card, but becomes unavailable when the cumulative amount exceeds the record limit amount. For example, a pinball card, a telephone card and an IO card are of this type. Under the circumstances, there are no means to prevent illegal use thereof.

A credit card can be used at member stores accepting the card. When using a credit card, the payment or repayment of the price for a product is postponed for a certain grace period. As used throughout, the term product refers to goods and a services and data. Further, the price for the product is automatically paid from a corresponding bank account. Authorization is, however, needed so as to prevent any illegal use of a credit card. It is common to use credit cards for the payment of charges for utilizing a system for acquiring value-added data or various control data through a wire telephone circuit, a radiotelephone circuit or satellite broadcasting.

An IC card is a card with an embedded IC having a memory portion, which serves as a storage unit, and a microprocessor portion. Thus, an IC card itself has logical processing functions such as data generation and logical decision. For instance, electronic money is of this type. An IC embedded in the card has the function of checking authenticity and of rewritably storing electronic money data transferred thereto. This rewritable storage function permits a person, who is other than a purchaser, to rewrite an IC card.

The conventional card systems, however, have encountered the following problems in the case of delivering products by using these cards:

(1) Prepaid Cards

① Because each purchaser's data is not linked with a management computer, magnetic information can be illegally changed. Moreover, prepaid cards are easily counterfeited. Actually, as is well known, the presence of counterfeited pinball cards has become widespread.

② Readers, such as a card reader, designed specifically for reading prepaid cards are necessary. Thus, miniaturization, power-saving and reduction in price of prepaid cards cannot be realized.

③ Because data cannot be reloaded into a prepaid card, the prepaid card cannot be used again after cash represented by cash data or a call rate represented by call-rate data is used up.

④ When purchasing software by a machine for selling software, which is installed in the form of a vending machine, or when purchasing a communication playing game and software, of the communication utilizing type for acquiring image information and music information by using communication, there is the necessity for purchasing a prepaid card in addition to such software. This is very inconvenient for a purchaser.

(2) Credit Cards

① Purchasers are limited to possessors of credit cards. This is a hindrance to increasing the number of purchasers.

② It is troublesome to contract with a credit card company to possess a credit card. This is an obstacle to increasing the number of purchasers.

③ Credit cards do not have a function of communicating with a computer of a data deliverer or management company about sales conditions of products. Thus, sales management cannot be performed.

(3) IC Cards

An IC card has logical processing functions such as data generation and logical decision. Thus, IC cards do not have the defects of prepaid cards and credit cards, but have encountered the following problems:

① Data to be stored in an IC card includes many various data, such as personal data, which should be concealed. To ensure security, advanced encryption techniques and sophisticated anti-copying techniques are required.

② A very large-scale IC-card system is needed. Moreover, the structure of an IC card is complex.

③ The memory capacity of an IC card is low. It is thus difficult to store a large size program, such as software, in an IC card.

④ IC card systems are still in an experimental stage. It is therefore difficult to use IC cards at low cost.

In the game industry, systems for software delivery through a network have already been put into service. However, in the case of the conventional card systems, software cannot be delivered easily and safely from deliverers by using cash data.

The invention eliminates the problems of the conventional product delivery techniques for delivering primary data, including software, from a data deliverer at the request of a purchaser. The invention also eliminates problems of conventional product delivery techniques that rely on credit cards or prepaid cards.

SUMMARY OF THE INVENTION

Accordingly, one aspect of the invention is a primary data delivery method by which primary data, including software, is delivered easily and safely by using a rewritable record medium. Further, another aspect of the invention is a system for performing such a method.

In accordance with an aspect of the invention, there is provided a data delivery method which comprises: setting a purchaser rewritable record medium in such a manner as to be able to record primary data and additional data, which includes purchaser inherent data, purchase data and accounting data therein; recording historical data representing history of the additional data in both a computer of a data deliverer and the purchaser rewritable record medium, respectively; and delivering the primary data, which is requested by a purchaser, from the computer of the data deliverer to the computer of the purchaser or the computer of a shop when the historical data recorded in the computer of the data deliverer is matched with the historical data recorded in the purchaser rewritable record medium and an accounting operation is performed.

Further, in accordance with another aspect of the invention, there is provided another data delivery method of delivering primary data, which is requested by a purchaser, from a data deliverer to the purchaser through a communication network, which comprises: preparing a purchaser rewritable record medium adapted so that additional data, which includes three kinds of data that are purchaser inherent data, purchase history data representing a history of purchase of the primary data to be purchased by the purchaser, and accounting data are recorded therein; reading the additional data, which is recorded in the purchaser record medium, by a computer of the purchaser; and transmitting the read additional data to the computer of the data deliverer, on which data management is performed in such a manner as to prevent the purchaser from writing data thereto; retrieving data, which corresponds to the transmitted additional data, from original data recorded in the computer of the data deliverer; collating the retrieved corresponding data with the additional data; stopping delivery of the primary data if not matched, whereas if matched, an accounting operation is performed on the primary data which the purchaser requests, and only if a result of the accounting operation indicates that the accounting data recorded in the purchaser record medium is not negative, the primary data requested by the purchaser, and the additional data, which relates or corresponds to the requested primary data and includes two kinds of data that are purchase history data to be added owing to the purchase of the requested primary data and accounting data resulting from the accounting operation, are delivered from the data deliverer to the computer of the purchaser; performing recording of the additional data relating to the delivered primary data in the purchaser record medium; and performing recording of the additional data relating to the delivered primary data, to the computer of the data deliverer.

Fabrication or forging of a prepaid card is possible because the accounting data (representing an available balance (rate)) recorded on the prepaid card is not managed at all and when the accounting data (namely, an available balance) reaches zero, the prepaid card is merely recognized as being spent. The invention provides a technique of finding a forged rewritable record medium at the time of using a prepaid card by managing the additional data, instead of preventing the fabrication or forgery of a prepaid card, as a technique for solving this problem.

In accordance with another aspect of the invention, when authorized or legal additional data is recorded in a purchaser rewritable record medium, the same additional data is simultaneously recorded in the computer of the data deliverer. Thus, if unauthorized or illegal data is recorded in the purchaser record medium, separately from the computer of the data deliverer, or in the case that a purchaser record medium is counterfeited, such an unauthorized or illegal past data recorded in a (counterfeited) purchaser record medium is not matched with the past data recorded in the computer of the data deliverer, because the unauthorized or illegal data or the same additional data recorded in the purchaser record medium is not recorded in the computer of the data deliverer. Consequently, an unauthorized use of a forged purchaser record medium or a purchaser record medium in which data is tampered can be effectively prevented by collating the additional data.

Further, additional data relating to the primary data to be delivered to the computer of the purchaser or the computer of the shop is recorded and accumulated in the computer of the data deliverer, simultaneously with the purchase of primary data. Thus, the management of sales of primary data can be achieved. Moreover, the additional data, which includes accounting data, is recorded in the purchaser record medium. Hence, there is no necessity for separately purchasing a record medium for primary data and a prepaid card for purchasing the primary data, as is required in the conventional method. It is sufficient to purchase only a single purchaser record medium.

Further, if record media which anyone can purchase are adopted as the purchaser record media, there is no need for making a contract or signing up as in the case of a credit card. Thus, anyone can obtain data delivery service only by purchasing a purchaser record medium through a proper channel. Consequently, an increase in the number of purchasers can be attained.

The purchaser record medium may be constituted by a magneto-optical disk or a removable hard disk. If the purchaser record medium is constituted by a magneto-optical disk or a removable disk, primary data and additional data can be written and read by a magneto-optical disk drive or a removable disk drive, which is incorporated in or is mounted outside an already-existing personal computer. Thus, a device, such as a card reader, designed specifically for reading primary data and data from a card is unnecessary. Consequently, a data delivery system can be configured at low cost.

Moreover, in accordance with another aspect of the invention, there is provided a data delivery method by which the purchaser deals indirectly with the data deliverer through a shop as opposed to a method in which the purchaser deals directly with the data deliverer.

The data delivery methods of the invention have the following advantages (1) to (4):

(1) The additional data in the purchaser record medium is also recorded in the computer of the data deliverer, which cannot be directly accessed by the purchaser. Thus even when the purchaser record medium is fabricated or is unauthorizedly rewritten because this record medium is rewritable, unauthorized use thereof can be effectively prevented by collating the additional data recorded in the purchaser record medium with the additional data recorded in the computer of the data deliverer. As a consequence, primary data can be delivered easily and safely.

(2) The purchaser can join only by purchasing the purchaser record medium. Thus, there is no need for making a contract or signing up, as is required when using a credit card. Consequently, an increase in the number of purchasers can be achieved.

(3) The single purchaser record medium is adapted so that primary data and the additional data including the purchaser inherent data and accounting data can be recorded therein. Thus, the single purchaser record medium serves as both a "container" for containing primary data and a bankbook (or passbook). Consequently, the primary data can be purchased only by purchasing a single purchaser record medium. The procedure through which a purchaser goes can be simplified.

(4) As a result of recording the additional data, which is recorded in the purchaser record medium, in the computer of the data deliverer, a data deliverer can manage the additional data recorded in the purchaser record medium. If the additional data is established in such a manner as to include primary data and purchaser inherent data and accounting data, the management of sales of primary data to be delivered can be easily achieved.

In accordance with another aspect of the data delivery method of the invention, when the purchaser meets service offering conditions of the data deliverer, the data deliverer pays a predetermined amount of money to the purchaser by inputting data representing the predetermined amount of money to the purchaser record medium so as to offer services from the data deliverer. Moreover, the payment of the predetermined amount of money is recorded in the computer of the data deliverer.

When a purchaser purchases a product such as primary data or goods or services by using a prepaid card, a balance recorded in the prepaid card is merely decreased because the purchaser performs only the purchase of the commodity. However, when using the method of the invention including the rewritable purchaser record medium, the purchaser record medium can be freely accessed from the computer of the data deliverer. Thus, accounting data representing the balance can be increased by inputting data representing an amount of money which is commensurate with the services to the purchaser record medium which is rewritable. Thus, what the system according to the invention performs at the time of delivering a product is not confined to degrading the worth of the purchaser record medium and abridging the purchaser's right thereto. The data deliverer can provide services to the purchaser by paying money to the purchaser, namely, by increasing the balance that is represented by the accounting data recorded in the purchaser record medium.

In accordance with another aspect of the invention, data management is performed by the computer of the data deliverer by using an authentication function in such a manner that the purchaser cannot write data thereinto. Thus, unauthorized or illegal writing of data by a purchaser to the computer of the data deliverer is prevented by fulfilling the authentication function which is a simple action or activity.

In accordance with another aspect of the invention, the purchaser inherent data includes data representing the age of the purchaser. In the case that an age limit is imposed to the product to be purchased, a limiting age is collated with the age of the purchaser when collating the retrieved corresponding data with the additional data. If the age of the purchaser is outside a permissible range in the case of the imposed age limit, the delivery of the product is stopped. Thus, as a result of imposing of the age limit to purchasers, harmful products can be effectively prevented from being delivered to purchasers whose ages are less than a limiting age.

In accordance with another aspect of the invention, the purchase history data includes data representing a title of the product, a price of the product, a name of a shop at which a purchaser has bought the product (namely, a name of a shop that has sold the product), a date and time at which the product is purchased, and the number of a write machine.

In accordance with another aspect of the invention, the purchaser inherent data includes data representing an identification (ID) number, a password, a date of a purchaser's birth, and a distinction of sex.

In accordance with another aspect of the invention, the accounting data includes data representing a date of accounting, an amount of deposited money, an amount of paid money, a balance, and a name of a shop that has accounted. Thus, necessary and sufficient data are recorded as the additional data. Consequently, products can be delivered more safely.

In accordance with another aspect of the invention, there is provided a data delivery system including: a computer of a data deliverer for delivering primary data such a software; a computer of a shop receiving the primary data delivered from the computer of the software deliverer through a communication network; a purchaser record medium that is owned by a purchaser and has a primary data area for recording primary data purchased by a purchaser therein, and an additional data area for recording additional data including three kinds of data, including purchaser inherent data, purchase history data, which represents a history of purchase of the primary data, and accounting data therein, and is adapted to be able to rewrite the primary data and the additional data, which are recorded in the primary data area and the additional data area, respectively; data-deliverer-side recording means for recording data, which is identical to the additional data to be recorded in the purchaser record medium as original data therein; regulating means for imposing restriction on the rewriting of original data, which is recorded in the data-deliverer-side recording means by the purchaser; collating means for retrieving original data, which corresponds to the additional data recorded in the purchaser record medium, from the data-deliverer-side recording means, for collating the original data, which is recorded in the data-deliverer-side recording means, with the additional data which is recorded in the purchaser record medium and is sent from the computer of the shop to the computer of the primary data deliverer through the network, for continuing an operation of delivering the primary data if matched, and for stopping the operation of delivering the primary data if not matched, and control means for performing an accounting operation, which relates to the primary data to be purchased by the purchaser, when continuing the operation of delivering the primary data according to a result of collation performed by the collating means, for recording the primary data, which is delivered from the computer of the data deliverer to the computer of the shop through the network, in the primary data area of the purchaser record medium, and for recording the additional data, which includes two kinds of data, namely, purchase history data and accounting data to be related to the primary data purchased by the purchaser and to be added when purchasing the primary data, in the additional data area of the purchaser record medium and in the data-deliverer-side recording means. The data-deliverer-side recording means, regulating means, collating means and control means are provided in the computer of the data deliverer.

Because of the restriction imposed on the rewriting of additional data recorded in the data-deliverer-side recording means of the data delivery system of the invention, the purchaser cannot change the additional data recorded in the data-deliverer-side recording means even when the purchaser can unauthorizedly or illegally change the additional data recorded in the purchaser record medium. Therefore, although the purchaser record medium is rewritable, the purchaser record medium cannot be used unauthorizedly or illegally by being rewritten. With the simple configuration by which the same data as the additional data recorded in the additional data area of the purchaser record medium is simply recorded in the data-deliverer-side recording means, unauthorized or illegal use of a purchaser record medium due to fabrication or falsification can be prevented even when using a rewritable purchaser record medium. A highly reliable data delivery system can be constructed by employing a simple structure by which an additional data area is added to the purchaser record medium for recording primary data to be purchased by a purchaser therein, and additional data, such as the purchaser inherent data, the accounting data and data relating to the primary data, are recorded in the additional data area and are simultaneously recorded in the data-deliverer-side recording medium and then managing both of the additional data.

In accordance with another aspect of the invention, there is provided a rewritable purchaser record medium including: a primary data area, in which primary data, including software requested by a purchaser, is recorded; and an additional data area in which additional data that relates to the primary data and includes three kinds of data, namely, purchaser inherent data, purchase data history and accounting data, is recorded.

Thus, in the case of employing the purchaser record medium of the invention, such a single record medium can have a program storing function and a bankbook (or passbook) function. Further, unauthorized or illegal use of a purchaser record medium due to fabrication or falsification can be prevented by such a simple structure of a rewritable purchaser record medium in which the primary data area and the additional data area are provided.

In accordance with another aspect of the invention, there is provided a method and system for delivering a product using the purchaser record medium. The product is delivered from a management company. A computer of a device associated with the management company reads the additional data, including the purchaser inherent data, accounting data, and purchase history data, recorded in the purchaser record medium and transmits it to a computer of the management company. The computer of the management company collates the read, transmitted additional data from the purchaser record medium and if it matches original additional data recorded in the computer of the management company, allows the delivery of the product.

In accordance with another aspect of the invention, the delivery of goods and services can be stopped if an age limit is imposed on the delivery.

In accordance with another aspect of the invention, unauthorized or illegal changing of the additional data recorded in the additional data area of the purchaser record medium can be detected as it will not match the original additional data recorded in the computer of the management company and delivery of the goods or services can be stopped. Therefore, although the purchaser record medium is rewritable, the purchaser record medium cannot be used unauthorizedly or illegally by being rewritten.

In accordance with another aspect of the invention, the management company can offer services or money to the purchaser when the purchaser meets certain service offering conditions. The computer of the management company can record data representing cash to the purchaser record medium when the purchaser meets the service offering conditions.

In accordance with another aspect of the invention, data management is performed by the computer of the management company by using an authentication function in such a manner that the purchaser cannot write data thereinto. Thus, unauthorized or illegal writing of data by a purchaser to the computer of the management company is prevented by fulfilling the authentication function which is a simple action or activity.

BRIEF DESCRIPTION OF THE DRAWINGS

Other features, objects and advantages of the invention will become apparent from the following description of a preferred embodiment with reference to the drawings in which like reference characters designate like or corresponding parts throughout several views, and in which:

FIG. 5 is a block diagram illustrating the data format used in a purchase history data region according to the invention and examples of such data used therein;

FIG. 6 is a block diagram illustrating the data format used in a purchase inherent data region and an accounting data region according to the invention and examples of such data used therein.

DETAILED DESCRIPTION OF PREFERRED EMBODIMENTS

Hereinafter, embodiments of the invention, including, product delivery methods and systems of the invention applied to the sale of products including primary data, goods or services, to be delivered by a data deliverer or management company through a communication network will be described in detail by the accompanying drawings.

According to a system and method of the invention, when delivering primary data from the data deliverer to a purchaser who comes to the shop, not only the primary data but data relating to the contents of the purchased primary data and accounting data may be recorded in a removable purchaser record medium set in the computer of the shop. Moreover, the data relating to the contents of the purchased primary data and the accounting data are also recorded in the computer of the software deliverer. Thus, unauthorized or illegal use of the card is prevented by collating the data recorded in the purchaser recording medium with the past data recorded in the computer of the data deliverer.

System Configuration

Figure 1:
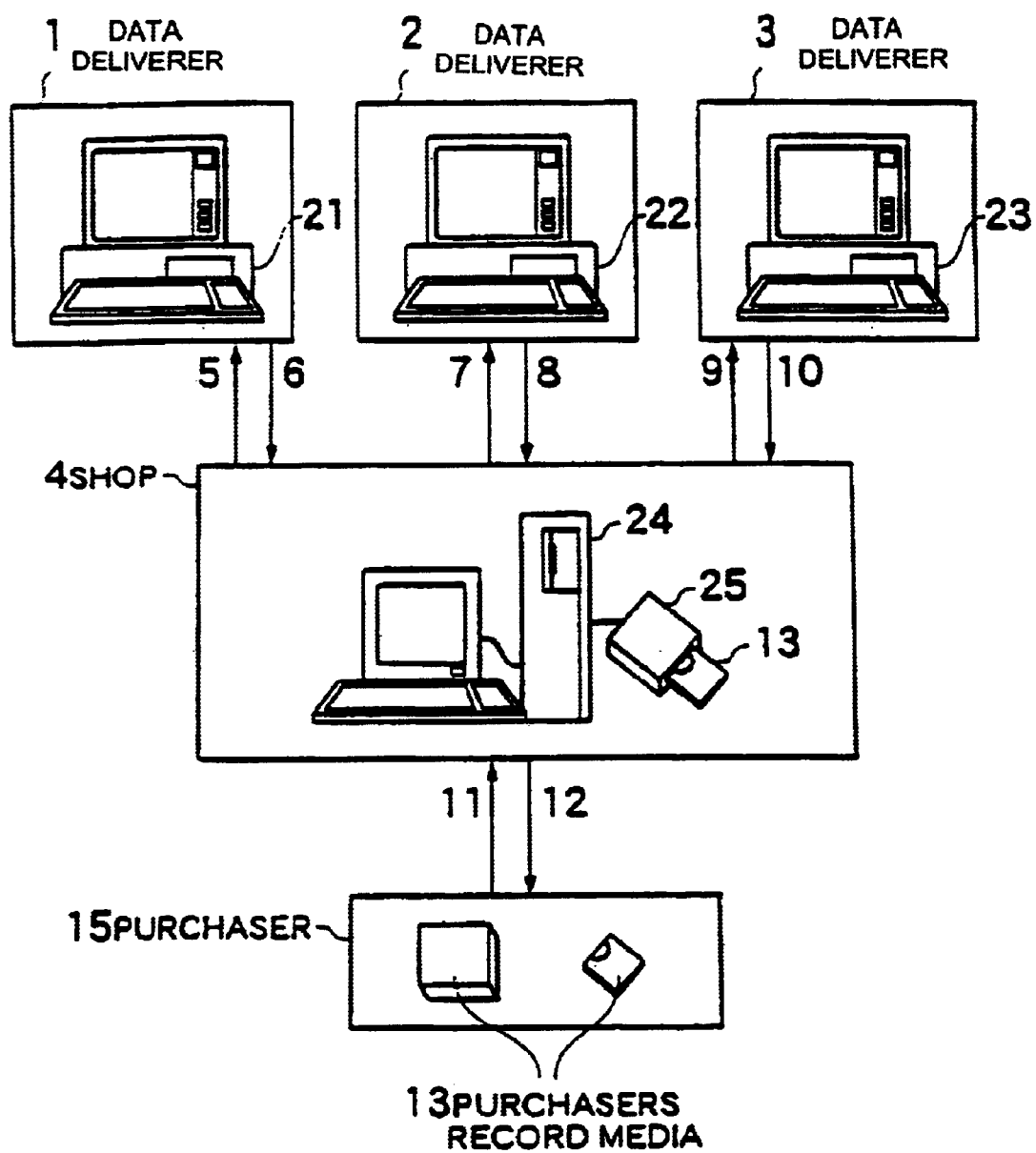
FIG. 1 is a block diagram illustrating the configuration of a system according to the invention.

FIG. 1 is a block diagram illustrating the configuration of a primary data sales system. Data deliverers 1 to 3 deliver original primary data. The primary data delivered may be, for example, software, MIDI (Musical Instrument Digital Interface), map information, including area or road maps for a specified location; or text information, including news (including newsflashes and past news from newspaper or magazine publishers), sports news (including the latest betting information such as horse race odds or point spread information), and stock market or financial market news (including updated stock prices) The data deliverers 1 to 3 deliver original primary data from the computers 21 to 23 thereof to the computer 24 of a shop 4 through communication networks 6, 8 and 10, for instance, wire communication networks, such as a general public telecommunication line, an integrated services digital network (ISDN) and a cable television (CATV) network, and radio communication networks utilizing optical communications, acoustic or sound waves and satellite communications. Incidentally, the reason why the words "deliverer" and "deliver" are used herein is that the primary data is actually distributed to many shops 4, though only one shop 4 is shown in this figure for convenience in drawing. The data deliverers manage data recorded in the computers 21 to 23 thereof by using the authentication functions individually. The authentication function is performed by using an identification number (ID) and a password that are allocated to each of the data deliverers. Thus, even when a purchaser tries to directly access the computer of the data deliverer, it is substantially impossible to tamper and download the data recorded therein. Databases, which are unique to the data deliverers 1 to 3 but are not open to the public, are constructed in the computers 21 to 23, respectively. These databases are associated with write machine numbers assigned to the write machines 25 of the computers 24 of the shops 4. Consequently, shops and persons other than the registered shops 4 cannot access such data bases.

The computer 24 of the shop 4 has the communicates with the computers 21 to 23 of the data deliverers 1 to 3. The computer 24 of the shop 4 is installed at a place which is convenient for purchasers to come, for example, in the inside or at the counter of a shop, such as a convenience store, or of a shop suited to the contents of the primary data for sale.

Purchaser 15 first purchases a rewritable purchaser record medium 13 at the shop 4. Alternatively, the purchaser 15 brings a general purpose record medium, which he has already purchased, to the shop 4 (see reference numeral 11). Then, the purchaser 15 communicates with a computer 21 to 23 of one of the data deliverers 1 to 3, respectively, through one of the communication networks 5, 7, 9, respectively, by using the computer 24 of the shop 4. The computer 24 of the shop 4 reads data from the purchaser record medium 13 and transmits the data to one of the computers 21 to 23 of the data deliverers 1 to 3, respectively. If the balance stored in the purchaser record medium 13 is not negative even after subtracting the price for the desired primary data therefrom, the desired primary data, which is delivered from the data deliverer 1 to 3 to the computer 24 of the shop 4, is written to the purchaser record medium 13, and then the purchaser takes this purchaser record medium 13 to his home (see reference numeral 12). The purchaser loads the purchaser record medium 13 into the main unit of a computer and thus can listen to or view the primary data. When the purchaser is done with the primary data, the purchaser can rewrite the primary data by replacing it with other primary data many times within the balance, namely, an amount of money indicated by the additional data recorded in the purchaser record medium 13. The purchaser may add primary data to the purchaser record medium 13, namely, increase the amount of primary data recorded therein within storage or memory capacity thereof. A removable hard disk, which is one of the most popular record media, may be employed as the purchaser record medium 13. As a result of using a removable hard disk, already existing personal computers can be used. Consequently, the system can be constructed at low cost.

Alternatively, the system may configured so that the primary data is not recorded to the purchaser record medium 13. The purchaser 15 can decide to have the primary data delivered to the computer 24 of the shop 4. The additional data from the purchaser record medium 13 is transmitted to the computer 21 to 23 of the data deliverer, 1 to 3, respectively. If the additional data is matched with data recorded in the computers 21 to 23 of the data deliverers 1 to 3, the primary data is delivered to the computer 24 of the shop 4 for the purchaser to listen to or view. An accounting operation is performed and the accounting data is recorded in the computers 21 to 23 of the data deliverers 1 and 2 and 3, respectively, and in the purchaser record medium 13. Purchase history data is also recorded in the computers 21 to 23 of the data deliverers 1 to 3 and in the purchaser record medium 13. The primary data, however, is not recorded in the purchaser record medium 13.

Figure 2:
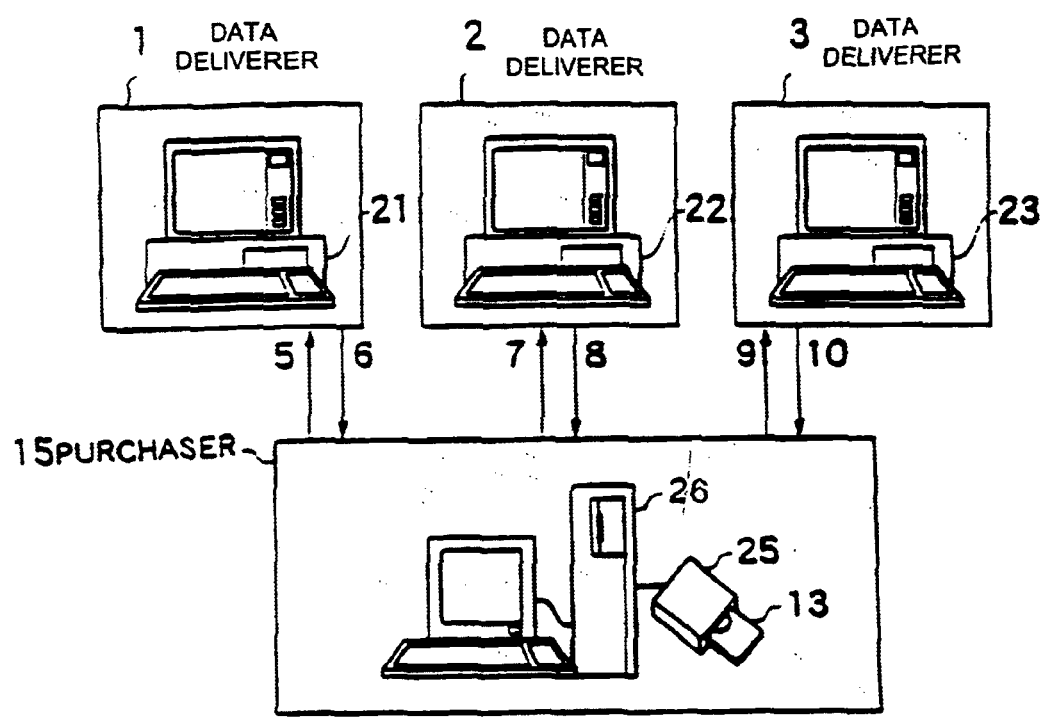
FIG. 2 is a block diagram illustrating the configuration of a system according to the invention.

Referring to FIG. 2, after the purchaser 15 has purchased the purchaser record medium 13, the purchaser 15 may purchase primary data directly from the data deliverers 1 to 3 by using the purchaser's computer 26. The purchaser's computer 26 reads the additional data in the purchaser record medium 13 and transmits it to a computer 21 to 23 of a data deliverer 1 to 3, respectively, by the communication networks 5, 7, 9. The read, transmitted data is collated by the computer 21 to 23 of the data deliverer 1 to 3, respectively, and if matched with the additional data stored in the computers 21 to 23 of the data deliverers 1 to 3, the primary data is delivered to the computer 26 of the purchaser 15 by the communication networks 6, 8, 10. An accounting operation is performed and the accounting information is recorded into the purchaser record medium 13 and the computers 21 to 23 of the data deliverers 1 to 3. The purchaser 15 can record the primary data in the purchaser record medium 13 or in the purchaser's computer 26. The purchaser can also listen to or view the data and not record the data.

Figure 3:
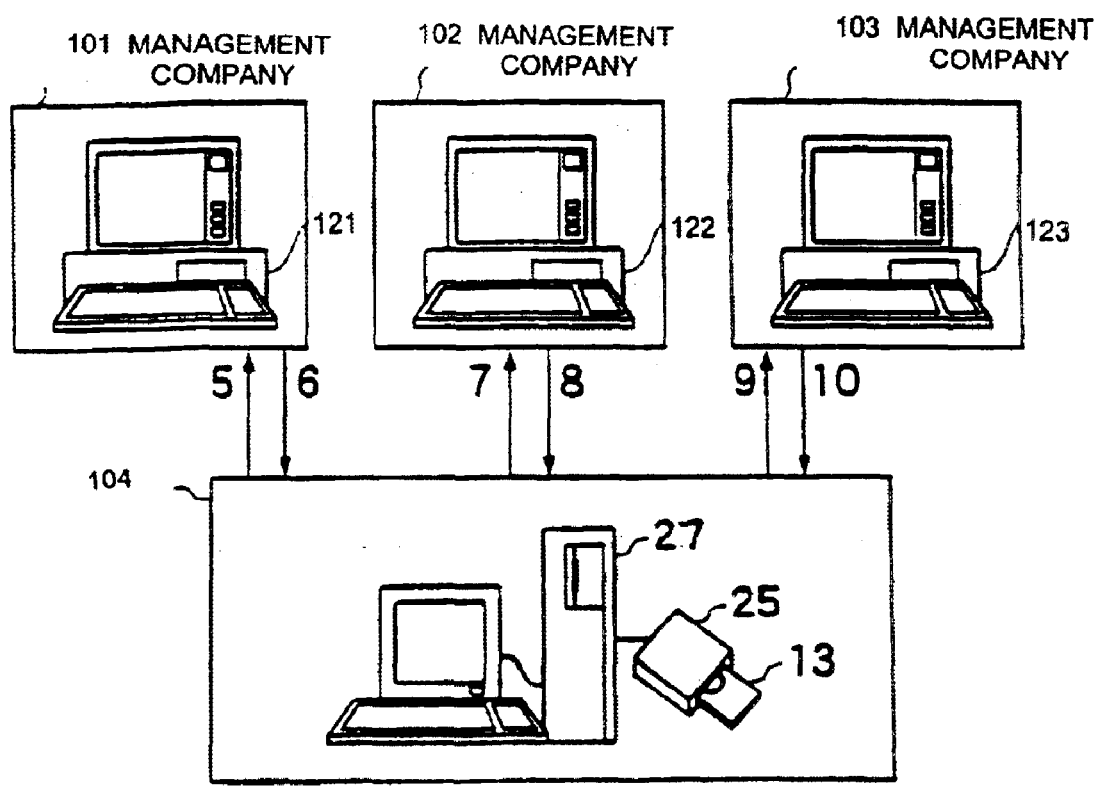
FIG. 3 is a block diagram illustrating the configuration of a system according to the invention.

FIG. 3 is a block diagram illustrating the configuration of a product delivery system according to the invention. Management companies 101 to 103 deliver products. Devices 104 associated with the provision of goods and services are provided and managed by the management companies 101 to 103. The associated device 104 may be, for example, a telephone available for public use, an automatic vending machine for dispensing goods, a toll booth that controls access to an expressway, or a register of a store that sells products. When the purchaser 15 wishes to obtain a product or products, the additional data in the purchaser record medium 13 is read by a computer 27 of the associated device 104 and transmitted to the computers 121 to 123 of the management companies 101 to 103 by the communication networks 5, 7, 9. If the additional data recorded in the purchaser record medium 13 matches the additional data stored in the computers 121 to 123 of the management companies 101 to 103, the product or products are delivered to the purchaser 15. For example, if the additional data matches, a phone call requested by the purchaser 15 is put through. If the additional data does not match, the call is not put through. Alternatively, if expressway usage is requested and the additional data matches, expressway usage is granted by the removal of a barrier to the expressway. If the additional data does not match, expressway usage is not granted. As another example, if goods are requested from a vending machine, the goods will be dispensed if the additional data matches. If the additional data does not match, the goods will not be dispensed. If the associated device 104 is the register of a store, if the additional data matches, the sale is completed and the product or products are delivered to the purchaser 15. If the additional data does not match, the product or products are not delivered to the purchaser 15.

Figure 4:
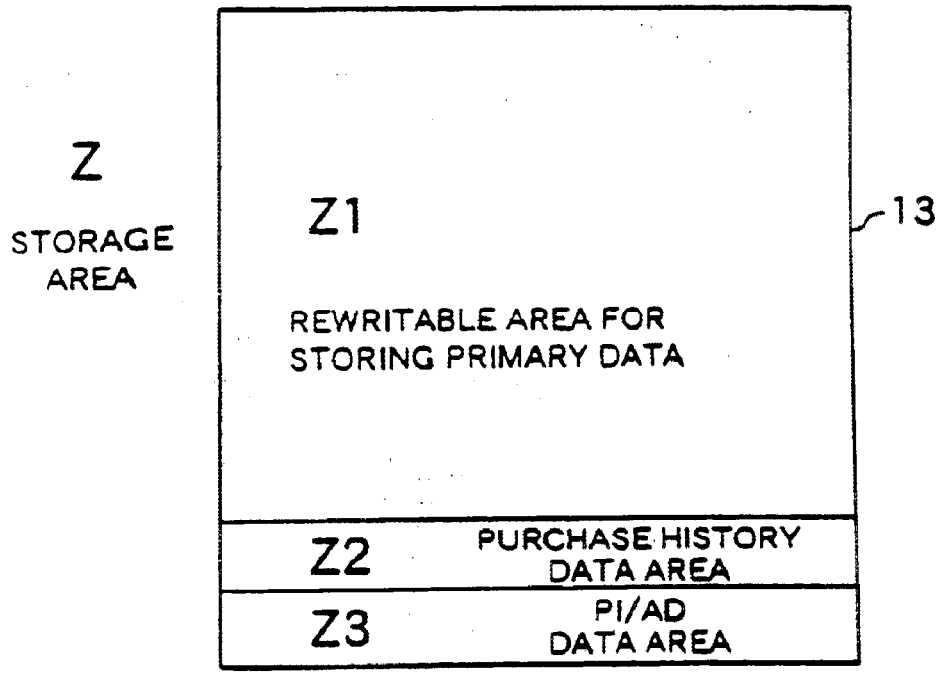
FIG. 4 is a block diagram illustrating the allocation of storage areas of a purchaser record medium according to the invention.

As illustrated in FIG. 4, a storage area Z of the purchaser record medium 13 is composed of: a rewritable area Z1 for storing primary data, including, for example, software, in such a manner as to be able to rewrite or replace currently recorded data; a purchase history data area Z2; and a purchaser inherent-data/accounting data area Z3. Primary data area may be recorded into the rewritable area Z1, while the additional data area is recorded into the purchase history data area Z2 and the purchaser inherent-data/accounting-data area Z3. Software such as game software for playing interactive communication games of chess, "go" or "shogi" by using game machines or personal computers, and/or data such as image data and music data are written to the rewritable area Z1. Other information is written to the purchase history data area Z2 and the purchaser inherent-data/accounting-data area Z3. Incidentally, the purchase history data area corresponds to a merchandise management ledger. Further, the purchaser inherent-data/accounting-data area Z3 corresponds to a passbook or bankbook.

When the purchaser sets the purchaser record medium 13 in the write machine 25 of the computer 24 of the shop 4 or the write machine 25 of the computer 26 of the purchaser 15 so as to purchase primary data, the computer 24 of the shop 4 or the computer 26 of the purchaser 15 writes the primary data, which is delivered from the data deliverer 1 to 3, to the rewritable area Z1, and also writes additional data to the purchase history data area Z2 and the purchaser inherent-data/accounting-data area Z3. When the purchaser 15 sets the purchaser record medium 13 in the write machine 25 of the computer 27 of the associated device 104, the computer 121 to 123 of the management company 101 to 103 writes additional data to the purchase history data area Z2 and the purchaser inherent-data/accounting-data area Z3.

Simultaneously with the writing of the data to the purchaser record medium 13, the computer 24 of the shop 4 or the computer 26 of the purchaser 15 or the computer 27 of the associated device 104 sends the same data as the purchase history data and the purchaser inherent-data/accounting-data, which are written to the purchaser record medium 13, to the computers 21 to 23 of the data deliverers 1 to 3 and the computers 121 to 123 of the management companies 101 to 103 through the communication networks 5, 7, 9, and records the same data as the purchase history data and the purchaser inherent-data/accounting-data in the computers 21 to 23 and 121 to 123.

The data deliverers 1 to 3 and management companies 101 to 103 refer to the same data as the purchaser inherent-data/accounting-data recorded in the purchaser record medium 13, and make up accounts by subtracting the price of the delivered primary data from the balance indicated by the same data as the purchaser inherent-data/accounting-data. Moreover, the data deliverers 1 to 3 and management companies 101 to 103 refer to the purchase history data and perform other accounting operations such as addition and collation operations.

An accounting system of the communication network can be utilized when delivering value-added data to an unspecified number of purchasers through a satellite broadcasting system and the Internet. Incidentally, recording means, regulating means, collating means and means for causing the recording are constituted by the computers 21 to 23 and 121 to 123.

It should be appreciated that the purchaser 15 may choose not to have the primary data recorded in the primary data area Z1 of the purchaser record medium 13. The purchaser 15 may listen to or view the primary data on the computer 24 of the shop or the computer 26 of the purchaser 15 and only the additional data, including the purchase history data and the purchaser inherent-data/accounting-data is recorded in the purchaser record medium 13 and the computers 21 to 23 of the data deliverers.

It should also be appreciated that the purchaser record medium 13 may not include the rewritable area Z1. It should also be appreciated that if the purchaser record medium 13 includes the rewritable are Z1, but the purchaser 15 chooses not to have the primary data written to the rewritable area Z1 or uses the purchaser record medium 13 to obtain goods or services, the rewritable area Z1 of the purchaser record medium 13 is not used.

Purchase History Data and Purchaser Inherent-Data/Accounting-Data Recorded in Purchaser Record Medium
(1) Purchase History Data FIG. 5 shows an example of allotting a part of the storage area Z of the rewritable purchaser record medium 13 of the purchaser 15 to the purchase history data area Z2, and storing purchaser history data in the data area Z2.

According to a purchase history data format illustrated in this figure, one block of data consists of: data representing the title A1 of the purchased product; data representing the price A2 of the purchased product; data indicating the shop or associated device at which the purchaser has purchased the product; data designating the date and time A4 at the purchase of the product; and the identification number of the write machine 25 of the shop's computer 24 or the purchaser's computer 26 or the associated device's computer 27. Each time the purchaser purchases a product, one block of data ((B1 to B5), (C1 to C5), . . . is added to the purchaser record medium 13. Thus, purchase history data are accumulated therein without updating the past purchase history data. Incidentally, the specifications of the data format of data to be recorded in the purchase history data area may be determined according to the purposes of establishing such data. Thereby, the function of the system can be expanded.

① Examples of Purchaser History Data

When the purchaser purchased software titled "Strongest Shogi 1997" at 16:25 on Apr. 10, 1997 at a Kamata branch store of a chain store "THE CONVENIENCE" at 5,800 yen, the following data were recorded as purchase history data A1 to A5. "Strongest Shogi 1997" was stored as the title of the purchased software in a region A1. Numeric data "5800" obtained by simplifying price data "5,800 yen" was stored as the price of the purchased software in the region A2. Character data "THE CONVENIENCE Kamata branch store" was stored as the name of the shop, at which the purchaser purchased the software, in the region A3. Numeric data "199704101625" obtained by simplifying data "at 16:25 on Apr. 10, 1997" was stored in the region A4. The write machine No. "00002537" corresponding to the shop at which the purchaser purchased the software was stored in the region A5.

② When the purchaser purchased software titled "Best Golf Nagano Prefecture" at 11:38 on May 5, 1997 at a Shinjuku branch stores of "Marudai Department Store" at 4,900 yen, the following data were recorded as purchase history data B1 to B5. "Best Golf Nagano Prefecture" was stored as the title of the purchased software in a region B1. Numeric data "4900" obtained by simplifying price data "4,900 yen" was stored as the price of the purchased software in the region B2. Character data "Marudai Department Store Shinjuku branch store" was stored as the name of the shop, at which the purchaser purchased the software, in the region B3. Numeric data "199705051138" obtained by simplifying data "at 11:38 on May 5, 1997" was stored in the region B4. The write machine No. "0000027151138" corresponding to the shop, at which the purchaser purchased the software, is stored in the region B5.

③ When the purchaser purchased software titled "MAH-JONG LI-ZHI IPPATSU" at 21:57 on Jun. 20, 1997 at a Shibuya branch stores of the "Yotsukoshi Department Store" at 5,500 yen, the following data were recorded as purchase history data C1 to C5. Character data "MAH-JONG LI-ZHI IPPATSU" was stored as the title of the purchased software in a region C1. Numeric data "5500" obtained by simplifying price data 5,500 yen" was stored as the price of the purchased software in the region C2. Character data "Yotsukoshi Department Store" was stored as the name of the shop, at which the purchaser purchased the software, in the region C3. Numerical data "199706202157" obtained by simplifying data "at 21:57 on Jun. 20, 1997" was stored in the region C4. The write machine No. "00005963" corresponding to the shop, at which the purchaser purchased the software, was stored in the region C5.

(2) Purchaser Inherent-Data/Accounting-Data

FIG. 6 shows an example of assigning a part of the storage area Z of the rewritable purchaser record medium 13 of the purchaser 15 to the purchaser inherent data/accounting data area Z3, and storing purchaser inherent-data/accounting-data in the data area Z3.

The purchaser inherent-data/accounting-data includes: purchaser inherent data; and accounting data. The purchaser inherent data includes: data representing an identification (ID) number D1; data representing a password D2; data representing the date of the purchaser's birth D3; and data designating the distinction of sex of the purchaser D4. On the other hand, the accounting data includes: data representing the date and time of accounting E1; data representing an amount of deposited money E2; data representing an amount of paid money E3; data indicating a balance E4; and data designating a shop or associated device having accounted E5. According to the purchaser inherent-data/accounting-data area format illustrated in this figure, one block of the accounting data consists of the data E1 to E5. Each time the purchaser purchases a product, one block of the accounting data ((F1 to F5), (G1 to G5), (H1 to H5), . . . ) is added to the purchaser record medium 13. Thus, the accounting data are accumulated therein without updating the past purchase history data. Incidentally, the specifications of the data format of data to be recorded in the purchaser inherent-data/accounting-data area may be determined according to the purposes of establishing such data. Consequently the function of the system can be expanded.

① Examples of Purchaser Inherent Data/Accounting Data

In a region D1, data "ST781249" is registered as the ID No. assigned to the purchaser. Numeric data representing a password "7298" determined by the purchaser of his own choice as the password is stored in a region D2. Data "1959.02.23" indicating the corresponding date of the purchaser's birth in the Christian Era (in the case that the date of his birth is February 23 of thirty-fourth year of Showa) is stored in a region D3. If the purchaser is male, a value of "0" is stored, and in contrast, if the purchaser is female, a value of "1" is stored as data registered for distinction of sex of the purchaser in a region D4.

② When the purchaser deposited 20,000 yen into the purchaser record medium (i.e., purchased balance data representing 20,000 yen) at 16:20 on Apr. 10, 1997 at a Kamata branch stores of a chain store "THE CONVENIENCE", the following data were recorded as the accounting data E1 to E5. Numeric data "199704101620" obtained by simplifying data "at 16:20 on Apr. 10, 1997" was stored in the region E1 as indicating "the date of accounting". Numeric data "20000" obtained by simplifying deposited amount data "20,000 yen" was stored in the region E2 as indicating the "amount of deposited money". A value of "0" was stored in the region E3 as representing the "amount of paid money". Numeric data "20000" obtained by simplifying balance data "20,000 yen" was stored in the region E4 as representing a current balance.

③ In the case that the purchaser purchased software at 16:25 on Apr. 10, 1997 at a Kamata branch stores of a chain store "THE CONVENIENCE" at 5,800 yen, the following data were recorded as the accounting data F1 to F5. Numeric data "199704101625" obtained by simplifying data "at 16:25 on Apr. 10, 1997" was stored in the region F1 as indicating "the date of accounting". A value of "0" was stored in the region F2 as indicating the "amount of deposited money". Numeric data "5800" obtained by simplifying the price of the purchased software "5,800 yen" was stored in the region F3 as representing the "amount of paid money". Numeric data "14200" obtained by simplifying balance data "14,200 yen" (E4+F2−F3=14,200) was stored in the region F4 as representing a current balance.

④ In the case that the purchaser purchased software at 11:38 on May 5, 1997 at a Shinjuku branch stores of "Marudai Department Store" at 4,900 yen, the following data were recorded as purchase history data G1 to G5. Numeric data "199705051138" obtained by simplifying data "at 11:38 on May 5, 1997" was stored in the region G1 as indicating "the date of accounting". A value of "0" was stored in the region G2 as indicating the "amount of deposited money". Numeric data "4900" obtained by simplifying the price of the purchased software "4,900 yen" was stored in the region G3 as representing the "amount of paid money". Numeric data "9300" obtained by simplifying balance data "9,300 yen" (F4+G2−G3=9,300) was stored in the region G4 as representing a current balance.

⑤ In the case that the purchaser purchased software at 21:57 n Jun. 20, 1997 at a Shibuya branch stores of the "Yotsuloshi Department Store" at 5,500 yen, the following data were stored as the accounting data H1 to H5. Numeric data "199706202157" obtained by simplifying data "at 21:57 on Jun. 20, 1997" was stored in the region H1 as indicating "the date of accounting". A value of "0" was stored in the region H2 as indicating the "amount of deposited money". Numeric data "5500" obtained by simplifying the price of the purchased software "5,500 yen" was stored in the region H3 as representing the "amount of paid money". Numeric data "3800" obtained by simplifying balance data "3,800 yen" (G4+H2−H3=3,800) was stored in the region H4 as representing the current balance.

Flow of Data

Products are delivered by utilizing the communication networks 5 to 10 established between the computer 24 of the shop 4 or the computer 26 of the purchaser 15 or the computer 27 of the associated device 104 and the computers 21 to 23 of the data deliverers 1 to 3 and the computers 121 to 123 of the management companies 101 to 103 installed in the offices of the data deliverers 1 to 3 and the management companies 101 to 103. Cash data is exchanged therebetween by utilizing these communication networks 5 to 10. The data deliverers 1 to 3 and the management companies 101 to 103 collate data sent from the purchaser record medium 13 of the purchaser 15 having purchased a product or products with the past recorded data. If matched, the delivery of the product or products is continued. Conversely, if not matched, the data deliverers or management companies stop the delivery and take a necessary step.

(1) System for Finding Forgery

When legally writing additional data to additional data area Z and Z3 of the purchaser record medium 13 through the shop 4 or the associated device 104, the same data as the additional data is written to the computers 21 to 23 of the data deliverers 1 to 3 and the computers 121 to 123 of the management companies 101 to 103. Therefore, the purchaser inherent-data/accounting-data of the purchaser record media 13 of all of the registered purchasers are recorded in the computers 21 to 23 of the data deliverers 1 to 3 and the computers 121 to 123 of the management companies 101 to 103. As long as there is no data unauthorizedly or illegally written to the purchaser record medium 13, certain additional data recorded in the computers 21 to 23 and 121 to 123 is matched with corresponding additional data recorded in the purchaser record medium 13. Thus, if there is forged data, no match occurs in the collation therebetween. Consequently, the presence of forged data can be found.

Figure 7:
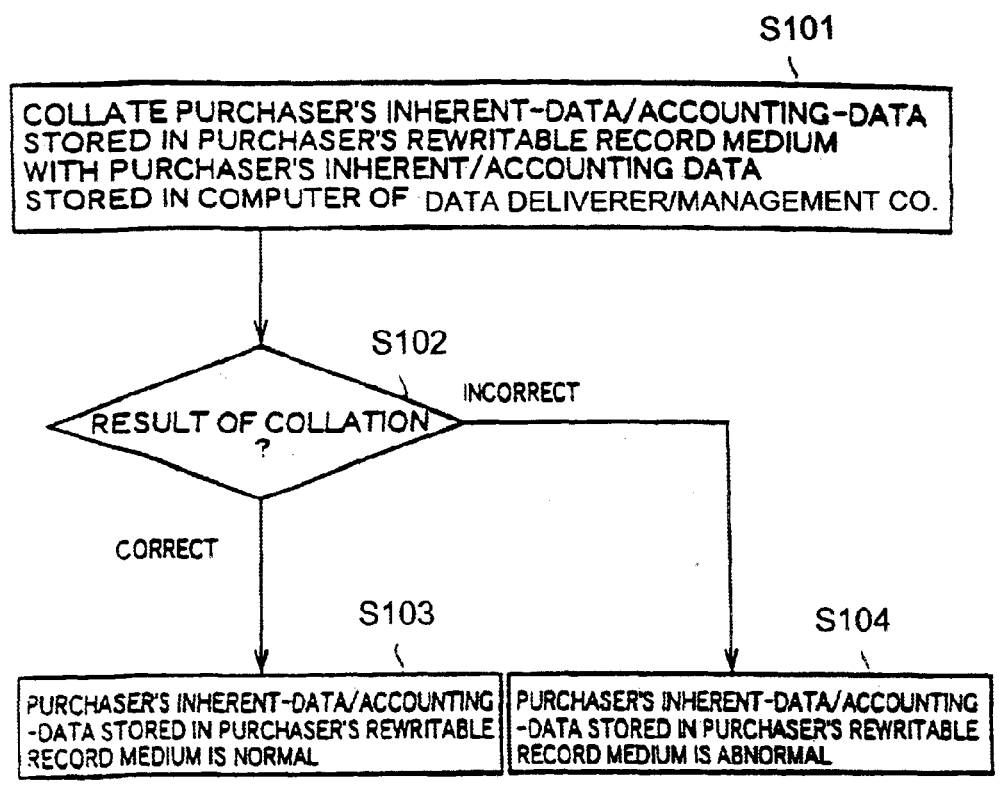
FIG. 7 is a flowchart illustrating a process of finding a fabrication of a purchaser record medium according to the invention.

As illustrated in FIG. 7, in step S101, the data deliverer or management company retrieves the purchaser inherent-data/accounting-data corresponding to the identification number, which is included in the purchaser inherent-data/accounting-data recorded in the purchaser record medium 13, from the purchaser inherent data/accounting data stored in the corresponding one of the computers 21 to 23 and 121 to 123. Then, the data deliverer or management company collates the purchaser inherent-data/accounting-data, which is recorded in the purchaser record medium 13, with the retrieved purchaser inherent-data/accounting-data stored in the corresponding one of the computers 21 to 23 or 121 to 123. At that time, if the collation of the accounting data therebetween is performed in addition to the collation of the purchaser inherent data, high-level security is obtained. As a result of the collation in step S102, if matched, the process advances to step S103 whereupon it is judged that the purchaser inherent data/accounting data recorded in the purchaser record medium 13 is normal. Thereafter, the computer of the data deliverer or management company proceeds to the delivery operation which includes the accounting process. In contrast, if not matched, the process advances to step 104 whereupon it is judged that the purchaser inherent data/accounting data recorded in the purchaser record medium 13 is abnormal. Then, the computer of the data deliverer stops the delivery operation. If necessary, the purchaser record medium 13 is forcibly ejected from the computer 24 of the shop 4 or the computer 27 of the associated device 104. Moreover, the data deliverers 1 to 3 and management companies 101 to 103 sometimes specify a purchaser who has used the purchaser record medium 13 illegally or unauthorizedly, and take a necessary step.

(2) Flow of Data after Collation

If it is judged that the purchaser inherent-data/accounting-data recorded in the purchaser record medium is normal, the data deliverer 1 to 3 or management company 101 to 103 delivers the product which is desired by the purchaser by utilizing the communication networks 6, 8, 10. At that time, the data deliverer 1 to 3 or management company 101 to 103 refers to the date of the purchaser's birth (D3) in the purchaser inherent-data/accounting-data (FIG. 4). Furthermore, if the age limit is imposed to the product to be delivered, and the purchaser is not allowed to use this product in view of the age limit, the data deliverer 1 to 3 or management company 101 to 103 restricts and stops the delivery of the product. Additionally, if necessary, the data deliverer 1 to 3 or management company 101 to 103 may cause the computer 24 or 27 to output a message indicating such a fact.

If the purchaser 15 requests primary data, the delivered primary data is recorded in the rewritable area Z1 of the purchaser record medium 13 by the computer 24 of the shop 4 or is sent to the computer 24 of the shop 4 for the purchaser to listen or view. In addition, the necessary data is recorded in the purchase history data area Z2 and the purchaser inherent-data/accounting-data area Z3 of the purchaser record medium 13. At that time, the same data is recorded in a purchase history data area and a purchaser inherent-data/accounting-data area of the computers 21 to 23 of the data deliverers 1 to 3 and the computers 121 to 123 of the management companies 101 to 103 through the communication networks 5, 7, 9. If the purchaser 15 requests goods or services, the goods and services are delivered to the purchaser. In addition, the necessary data is recorded in the purchase history data area Z2 and the purchaser inherent-data/accounting-data area Z3 of the purchaser record medium 13. At that time, the same data is recorded in the purchase history data area and the purchaser inherent-data/accounting-data area of the computers 21 to 23 of the data deliverers 1 to 3 and the computers 121 to 123 of the management companies 101 to 103 through the communication networks 5, 7, 9.

As above described, in the case of this embodiment, the same data as the additional data recorded in the purchaser record medium is stored in the computers of the data deliverers 1 to 3. Thus, the forged or tampered purchaser record medium or the double use of data can be checked by collating the additional data recorded in the record medium of the purchaser with the additional data stored in the computer of the software deliverer. Therefore, even if the record medium is a rewritable medium, the system is not affected by forged record media, and the reliability of the system can be enhanced.

Meanwhile, the shop does not need a machine, such as a card reader, designed for specifically reading cards. Further, the shop can utilize an already-existing personal computer equipped with a magneto-optical disk drive unit. Thus, the system can be constructed at low cost. Especially, the storage capacity of a magneto-optical disk is large. Thus, even game software, whose programs may be very large, can be recorded in a magneto-optical disk substantially without restrictions, differently from the case of utilizing IC card. The rewriting of primary data can be performed many times as long as permitted in view of the amount of the balance recorded in the purchaser record medium. When purchasing magneto-optical disks, there is no need for performing a time-consuming process of making a contract, differently from the case of using a credit card. Consequently, an increase in the number of purchasers can be achieved. Both primary data and additional data are written to a single magneto-optical disk. In other words, primary data and a card for purchasing the primary data are purchased at the same time. Therefore, as compared with the conventional case of purchasing primary data and a card separately, the purchase record medium of the invention is very convenient for purchasers.

The additional data, such as the purchase history data recorded in the purchaser record medium, is recorded in the computers of the data deliverers and the management companies. Thus, the sales management of products can be performed, differently from the conventional case of using credit cards. Moreover, the sales conditions of products can be grasped in real time. Therefore, the cost of this system of the invention is lower than the case of introducing POS terminals. In addition, the system, whose performance is equivalent to that of POS, can be constructed.

Further, the purchaser record medium is rewritable, differently from prepaid cards. Moreover, an additional data area, in which additional data is rewritten, is provided in the purchaser record medium. This enables the purchaser record medium of the invention to perform an addition of additional data, though only a subtraction of additional data is possible in the case of a conventional ordinary system using a medium such as a prepaid card. For example, the data deliverers and management companies can add additional data to the presently existing additional data the purchaser record medium as a token of appreciation for the purchaser's response to questionnaires from the data deliverers and management companies, as a giveaway offered by lot, or property or a right to use, which is transferred from another person. Consequently, a party providing information, such as data deliverers, can add a right to utilize their service to that of a purchaser of the information.

The same purchaser record medium can be used many times by writing new cash data thereto even when money represented by cash data recorded in the record medium is spent out. Consequently, effective utilization of resources can be achieved.

Data written to the purchaser record medium as the additional data is utilized. Thus, differently from the data deliverer or management company that uses the conventional system and charges only owners of credit cards, the data deliverer or management company using the system of the invention can charge persons other than the owners of credit cards and thus can increase the number of users or purchasers in addition to the owners of credit cards. Therefore, the invention provides a new accounting system for use in transactions by utilizing communications, by which additional data is referred to safely and easily, differently from the conventional system of using a credit card and a prepaid card. The additional data is added to the purchaser record medium by a block each time, and the past payment history is preserved and the additional data is not updated. Consequently, even if the data is tampered, such tampered data can be easily detected by collating the additional data with the past record. Incidentally, the invention is adapted so that the collation of only the purchaser inherent data/accounting data is performed. However, the collation of the entire additional data may be performed. Further, the collation is performed by the computer of the data deliverer or management company to thereby prevent an occurrence of an unauthorized or illegal act in the shop or at the associated device.

If there is no fear that an unauthorized or illegal act occurs in the shop or at the associated device, the computers of the shop and the associated device may have such a collating function, for example, in the following manner. The purchaser inherent-data/accounting-data recorded in the purchaser record media 13 of all of the registered purchasers are recorded in the computer 24 of the shop 4 and the computer 27 of the associated device 104. Then, the purchaser inherent-data/accounting-data corresponding to ID No., which is included in the purchaser inherent data/accounting data recorded in the purchaser record medium 13, is retrieved from the purchaser inherent data/accounting data stored in the computer 24 of the shop 4 and the computer 27 of the associated device 104. Then, the purchaser inherent-data/accounting-data, which is recorded in the purchaser record medium 13, is collated with the retrieved purchaser inherent-data/accounting-data stored in the computer 24 of the shop 4 and the computer 27 of the associated device 104.

Figure 8:
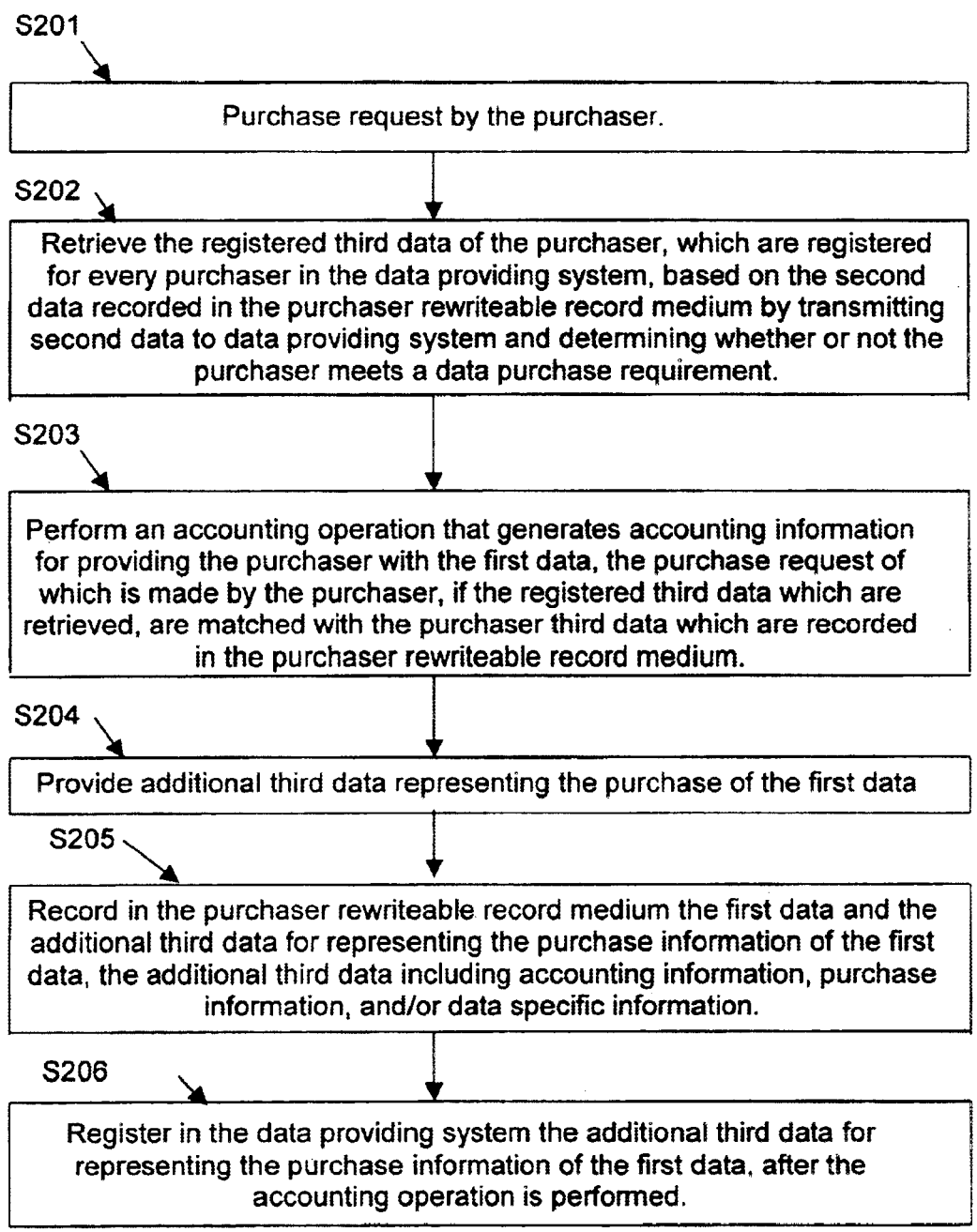
FIG. 8 is a flow chart illustrating the configuration of a system according to the invention.

FIG. 8 is a flow chart illustrating the steps in the data providing method according to one embodiment of this invention. As shown in FIG. 8, in step 201, a purchaser 15 makes a purchase request. In step 202, the registered third data of the purchaser, which are registered for every purchaser in the data providing system (represented by the data deliverers 1–3), are retrieved based on the second data recorded in the purchaser rewritable record medium 13. The second data are used to determine whether or not the purchaser 15 satisfies a data purchase requirement. The retrieval can be performed through a data process apparatus 24, 26 maintained either by the store 4 or the purchaser 15. In step 203, an accounting operation is performed for providing the purchaser 15 with the first data, if the registered third data, which are retrieved, match with the purchaser third data which are recorded in the purchaser rewritable record medium 13. In step 204, additional third data that represent the purchase of the first data are provided.

In step 205, the first data and the additional third data for representing the purchase information of the first data are recorded in the purchaser rewritable record medium. These additional third data include accounting information, purchase information and/or data specific information. Finally, in step 206, the additional third data for representing the purchase information of the first data are registered in the data providing system after the accounting operation is performed.

Figure 9:
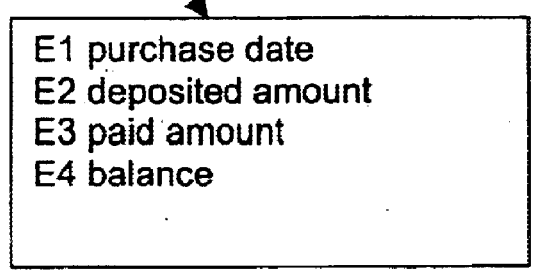
Figure 10:
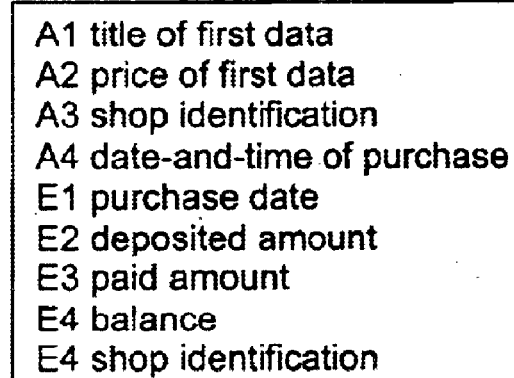

Matching the registered third data with the purchaser third data in step 203 includes comparing the registered third data from the data providing system with the purchaser third data from the purchaser rewritable record medium in step 102 of FIG. 7. The accounting information included in the additional third data, as shown in FIG. 9, can include one or more of the deposited amount E2, a paid amount E3, the balance account E4 information. These information examples are taken from FIG. 6. The purchase information included in the additional third data, as shown in FIG. 10, can include one or more of the title of the first data A1, the price of the first data A2, the shop identification A3, E5, the date of purchase E1, the time of purchase A4, the deposited amount E2, the paid amount E3 and the account balance E4. These information examples are also depicted in FIGS. 5 and 6.

The utilization of the communication networks is introduced to the system by assuming the application of the invention to a very large scale system. However, the invention can be applied to a small scale system which does not use communication networks.

A floppy disk, a magnetic disk, a magneto-optical disk (MO), an optical disk (including what is called "PD" (Phase-change-type optical Disk) manufactured by Matsushita Electric Industrial Co., Ltd.), a removable hard disk (including "Jaz drive" developed by Iomega Corporation), a high-capacity floppy disk (including "ZIP drive" developed by Iomega Corporation), DVD (Digital Video Disk), and high-capacity IC memory card (which will be available in future) may be employed as rewritable purchaser record media.

Systems and networks, which are different in criteria for charging users (for instance, the usage-sensitive rates depending upon the contents of software to be purchased and the quantity, quality or contents of value added data can be managed comprehensively, simply and safely by a single system. Additionally, to ensure high level security, the additional data may be encrypted.

The recording area of the purchase recording medium is partitioned into the purchase history data area and the purchaser inherent-data/accounting-data area. A part of the data is duplicatively stored therein. However, in place of these two data areas, a single data adding area may be established in the record medium so as to prevent the data from being stored duplicatively in the record medium.

If the quantity of data delivered from the data deliverers 1 to 3 to the shop 4 is very large, software or data may be directly delivered to the shop 4 by utilizing recording media such as CD-ROM (Compact Disk Read-Only Memory), and then the software or data may be written to the computer of the shop by regarding the shop as a data deliverer. Additionally, in the embodiment, the data deliverer trades in primary data indirectly with the purchaser through the shop. However, the data deliverer may trade in software directly with the purchaser by utilizing the Internet or personal computer communications.

Although the preferred embodiment of the invention has been described above, it should be understood that the invention is not limited thereto and that other modifications will be apparent to those skilled in the art without departing from the spirit of the invention. The scope of the invention, therefore, is to be determined solely by the appended claims.

What is claimed is:

1. A data providing method for providing a purchaser with first data from a retail seller onto a rewritable record medium through a purchase request, the seller having a data providing system having a data delivery portion for delivering the first data to the purchaser and a data intermediate portion connected with the data delivery portion via a communication line for intermediating between the data delivery portion and the rewritable record medium of the purchaser, the method comprising:

recording, for the purchaser, second data onto the rewritable record medium, the second data representing identification information of the purchaser;

retrieving, for the seller, the second data from the rewritable record medium onto the data intermediate portion;

producing third data including purchase information on an available purchaser balance for purchasing the first data;

recording the third data onto the rewritable record medium as purchaser third data;

registering for the purchaser the third data in the data providing system as registered third data;

retrieving the registered third data of the purchaser from the data providing system based on the second data recorded in the rewritable record medium, when the purchaser makes the purchase request of the first data;

comparing a registered relevant portion of the registered third data with a purchaser relevant portion of the purchaser third data that corresponds to the registered relevant portion to determine matching between the corresponding relevant portions;

performing an accounting operation that provides the purchaser with the first data in response to matching between corresponding relevant portions, the accounting operation producing additional third data that represent the purchase information for purchasing the first data;

recording, from the data delivery portion onto the rewritable record medium, the first data and the additional third data, after the accounting operation is performed; and registering in the data providing system the additional third data, after the accounting operation is performed.

2. The data providing method of claim 1, wherein:

the step of recording the first data and the additional third data comprises recording the purchase information in the purchaser rewritable record medium, wherein the purchase information includes accounting information that represents the accounting operation by subtracting a price of the first data from the available purchaser balance; and the step of registering in the data providing system the additional third data comprises registering the purchase information in the data providing system, the purchase information which includes the accounting information that represents the accounting operation.

3. The data providing method according to claim 2, wherein:

the step of recording in the purchaser rewritable record medium the first data and the additional third data further includes recording the accounting information in the purchaser rewritable record medium, wherein the accounting information includes each of deposited money account information that represents an amount of money which is deposited for purchasing the first data, paid money amount information that represents an amount of money which is paid to purchase the first data, and balance amount information that represents a balance after the first data have been purchased; and the step of registering in the data providing system the additional third data further includes registering the accounting information in the data providing system.

4. The data providing method according to claim 1, wherein:

the step of recording in the purchaser rewritable record medium the first data and the additional third data further includes recording the purchase information in the purchaser rewritable record medium, wherein the purchase information includes data specific information specifying the first data for which the accounting operation is performed; and the step of registering in the data providing system the additional third data further includes registering the purchase information in the data providing system.

5. The data providing method according to claim 4, wherein:

the step of recording in the purchaser rewritable record medium the first data and the additional third data further includes recording the purchase information in the purchaser rewritable record medium, wherein the purchase information includes data specification information each of having title information that represents a title of the first data, purchase price information that represents a purchase price of the first data, and purchase date and time information for representing a date and a time when the first data are purchased; and the step of registering in the data providing system the additional third data further includes registering the purchase information in the data providing system.

6. The data providing method according to claim 1, wherein:

the step of recording in the purchaser rewritable record medium the first data and the additional third data comprises recording the purchase information in the purchaser rewritable record medium, wherein the purchase information for purchasing the first data includes each of accounting information that represents the accounting operation, and data specification information that specifies the first data after the accounting operation is performed; and the step of registering in the data providing system the additional third data comprises registering the purchase information in the data providing system.

7. The data providing method according to claim 6, wherein the step of retrieving the registered third data of the purchaser comprises retrieving at least one information from the accounting information and the data specification information, and the step of performing the accounting operation comprises performing the accounting operation when the at least one information retrieved by the step of retrieving the registered third data of the purchaser is matched with corresponding purchase information of the purchaser third data recorded in the purchaser rewritable record.

8. The data providing method according to claim 1, wherein:

the step of recording in the purchaser rewritable record medium the first data and the additional third data comprises recording the purchase information in the purchaser rewritable record medium, wherein the purchase information includes each of title information that represents a title of the first data, purchase date and time information that represents a date and time when the first data are purchased, deposited money amount information that represents an amount of deposited money which is deposited for purchasing the first data, paid money amount information that represents an amount of money which is paid to purchase the first data, and balance amount information that represents a balance after the first data have been purchased; and the step of registering in the data providing system the additional third data comprises registering the purchase information in the data providing system.

9. The data providing method according to claim 1, wherein the step of performing the accounting operation comprises:

determining, with a determination process, whether or not the purchaser meets a predetermined data purchase requirement, based on the second data; and performing, with an accounting performing process, the accounting operation when the determination process determines that the purchaser meets the predetermined data purchase requirement.

10. The data providing method according to claim 9, wherein the step of determining, with a determination process, whether or not the purchaser meets a predetermined data purchase requirement, based on the second data further comprises representing, with a data purchase requirement, an age eligible to purchase the first data.

11. The data providing method according to claim 1, wherein:

the step of recording in the purchaser rewritable record medium further comprises accumulating the purchaser third data in the purchaser rewritable record medium, and the step of registering in the data providing system further comprises accumulating the registered third data in the data providing system after the accounting operation is performed.

12. The data providing method according to claim 1, further comprising recording a price information that represents a predetermined price in the purchaser rewritable record medium by the data providing system, when said purchaser meets a predetermined money requirement.

13. The data providing method according to claim 1, further comprising controlling the registered third data and the purchaser third data, such that the purchaser cannot rewrite the purchaser third data.

14. The data providing method according to claim 1, further comprising using the purchaser rewritable record medium that is a record medium having only a recording function as a function.

15. The data providing method according to claim 1, further comprising registering the registered third data in the data delivery portion.

16. The data providing method according to claim 1, wherein the step of performing the accounting operation is performed by the data delivery portion.

17. The data providing method according to claim 16, wherein the step of retrieving the registered third data of the purchaser comprises:

transmitting, via a transmission process, the second data and the purchaser third data recorded in the purchaser rewritable record medium from the data intermediate portion to the data delivery portion via the communication line; and retrieving, by the data delivery portion, via a retrieval process, the registered third data, based on the second data transmitted by the transmission process, and wherein the step of performing the accounting operation comprises:

determining, by the data delivery portion, via a determination process, whether or not the purchaser third data transmitted by the transmission process match the retrieved third data retrieved by the retrieval process; and performing, by the data delivery portion, via an accounting performing process, the accounting operation when the determination process determines that the purchaser third data match the retrieved third data.

18. The data providing method according to claim 1, further comprising registering the purchaser third data in the data intermediate portion to replace the registered third data.

19. The data providing method according to claim 1, wherein the steps of retrieving the purchaser third data and performing the accounting operation are performed by the data intermediate portion.

20. The data providing method according to claim 1, wherein the steps of retrieving, performing, recording and registering are performed by a data processing apparatus as the data intermediate portion, wherein the data processing apparatus is installed in a shop which sells the first data to the purchaser.

21. The data providing method according to claim 1, wherein:

the step of recording the first data in the purchaser rewritable record medium comprises:

transmitting, via a transmission process, the first data from the data delivery portion to the data intermediate portion via the communication line after the accounting operation is performed; and recording, by the data intermediate portion, via a record process, the first data and the additional third data, in the purchaser rewritable record medium after the accounting operation is performed; and the step of registering in the data providing system comprises registering, by the data delivery portion, via a registering process, the additional third data in the data delivery portion after the accounting operation is performed.

22. The data providing method according to claim 1, wherein:

the step of recording the first data in the purchaser rewritable medium comprises:

transmitting, via a transmission process, the first data from the data delivery portion to the data intermediate portion in advance of the step of performing an accounting operation; and recording, by the data intermediate portion, via a recording process, the first data and the additional third data in the purchaser record medium after the accounting operation is performed; and the step of registering in the data providing system comprises registering, by the data delivery portion, via a registering process, the additional third data in the data delivery portion after the accounting operation is performed.

23. The data providing method according to claim 22, wherein the transmission process transmits the first data from the data delivery portion to the intermediate portion by distributing a data record medium in which the first data are recorded, from the data delivery portion to the data intermediate portion, in advance of performing an accounting operation.

24. The data providing method according to claim 20, wherein:

the step of recording in the purchaser rewritable record medium the first data and the additional third data after the accounting operation is performed, comprises recording the purchase information in the purchaser rewritable record medium, wherein the purchase information includes accounting information that represents the accounting operation, and the accounting information includes deposited money amount information that represents an amount of deposited money which is deposited for purchasing the first data, paid money amount information that represents an amount of money which is paid to purchase the first data, balance amount information indicating a balance after purchasing the first data, accounting date and time information that represents a date and a time when the accounting operation is performed, and shop information that represents the data sale shop where the first data are sold, and the step of registering in the data providing system the additional third data after the accounting operation is performed comprises registering the purchase information in the data providing system, wherein the purchase information includes the accounting information, and the accounting information includes the deposited money amount information, the paid money amount information, the balance amount information, the accounting date and time information, and the shop information.

25. The data proving method according to claim 20, wherein:

the step of recording in the purchaser rewritable record medium the first data and the additional third data after the accounting operation is performed comprises recording the purchase information in the purchaser rewritable record medium, wherein the purchase information includes data specification information that specifies the purchased first data, and the data specification information includes title information that represents a title of the first data, purchase price information that represents a purchase price of the first data, shop information that represents a shop at which the first data are purchased, purchase date and time information that represents a date and time when the first data are purchased, and apparatus information that represents the data processing apparatus which writes the first data, and the step of registering in the data providing system the additional third data after the accounting operation is performed comprises registering the purchase information in the data providing system, wherein the purchase information includes data specification information specifying the purchased first data, and the data specification information includes the title information, the purchase price information, the shop information, the purchase date and time information, and the apparatus information.

26. The data providing method according to claim 20, wherein:

the step of recording in the purchaser rewritable record medium the first data and the additional third data after the accounting operation is performed comprises recording the purchase information in the purchaser rewritable record medium, wherein the purchase information includes each of title information that represents a title of the first data, deposited money amount information that represents an amount of deposited money which is deposited for purchasing the first data, paid money amount information that represents an amount of paid money which is paid to purchase the first data, balance amount information that represents a balance after purchasing the first data, purchase date and time information that represents a date and a time when the first data are purchased, shop information that represents a shop in which the first data are purchased, and apparatus information that represents the data processing apparatus which writes the first data; and the step of registering in the data providing system the additional third data after the accounting operation is performed comprises registering the purchase information in the data providing system, wherein the purchase information includes the title information, the deposited money amount information, the paid money amount information, the balance amount information, the purchase date and time information, the shop information, and the apparatus information.

27. The data providing method according to claim 1, wherein the steps of retrieving, performing, recording and registering are performed by a data processing apparatus as the data intermediate portion, wherein the data processing apparatus is associated with the purchaser.

* * * * *

UNITED STATES PATENT AND TRADEMARK OFFICE
CERTIFICATE OF CORRECTION

PATENT NO.    : 6,856,966 B1
DATED         : February 25, 2005
INVENTOR(S)   : Jun Fujimoto It is certified that error appears in the above-identified patent and that said Letters Patent is hereby corrected as shown below:

Column 22,
Lines 28 and 45, "claim 1," with -- claim 20, --.

Signed and Sealed this

Seventeenth Day of May, 2005

JON W. DUDAS
*Director of the United States Patent and Trademark Office*